US005991875A

United States Patent [19]

Paul

[11] Patent Number: 5,991,875

[45] Date of Patent: Nov. 23, 1999

[54] SYSTEM CONFIGURATION CARD

[75] Inventor: Keith A. Paul, St. Paul, Minn.

[73] Assignee: Micron Electronics, Inc., Nampa, Id.

[21] Appl. No.: 08/932,334

[22] Filed: Sep. 17, 1997

[51] Int. Cl.[6] ........ G06F 9/06

[52] U.S. Cl. ........ 713/2

[58] Field of Search ........ 395/651, 652, 395/653; 713/1, 2, 100; 710/8, 10, 12, 13

[56] References Cited

U.S. PATENT DOCUMENTS

| | | | |
|---|---|---|---|
| 5,204,512 | 4/1993 | Ieki et al. . | |
| 5,242,310 | 9/1993 | Leung . | |
| 5,276,317 | 1/1994 | Ozouf et al. . | |
| 5,310,998 | 5/1994 | Okuno . | |
| 5,336,099 | 8/1994 | Aldous et al. . | |
| 5,338,210 | 8/1994 | Beckham et al. . | |
| 5,367,571 | 11/1994 | Bowen et al. . | |
| 5,382,983 | 1/1995 | Kwoh et al. . | |
| 5,426,701 | 6/1995 | Herrmann et al. . | |
| 5,537,473 | 7/1996 | Saward . | |
| 5,550,575 | 8/1996 | West et al. . | |
| 5,563,400 | 10/1996 | Le Roux . | |
| 5,564,055 | 10/1996 | Asnaashari et al. | 395/651 |
| 5,588,058 | 12/1996 | Le Berre . | |
| 5,664,198 | 9/1997 | Chen et al. | 395/651 |
| 5,727,207 | 3/1998 | Gates et al. | 395/651 |
| 5,854,905 | 12/1998 | Garney | 395/284 |

*Primary Examiner*—Kevin A. Kriess
*Attorney, Agent, or Firm*—Dorsey & Whitney LLP

[57] ABSTRACT

One embodiment of the present invention relates to a user configurable computer-based system having a processor with an input/output ("I/O") bus. The system comprises a configuration card having non-volatile memory containing computer instructions governing system configuration and a set of contacts in the computer system for receiving the configuration card and to which the non-volatile memory of the configuration card can be connected. The computer system further comprises a stored boot-up instruction that causes the processor to read on its I/O bus the instructions governing system configuration and to execute the instructions governing system configuration as part of the start up of the system prior to accepting normal/other user input.

18 Claims, 5 Drawing Sheets

20
26
Rudimentary Software
28
System Configuration Software
18
30
Access Parameters
Diagnostics
32
34
Credit Card Cache With Optional Password Protection
22

SYSTEM CONFIGURATION CARD

TECHNICAL FIELD

The present invention relates to a system configuration card. In particular, the present invention relates to a portable, configuration card that stores software in memory, which, upon insertion into an audiovisual device, enables a processor in the device to configure the device in accordance with the user's configuration preferences.

BACKGROUND OF THE INVENTION

Many people own televisions, desktop computers, and laptop computers. Each of these devices may be used to access the internet and to view television programs. Moreover, the computers may also be used to perform other functions such as word processing.

When a conventional personal computer is first turned on, a Basic Input/Output System ("BIOS") is enabled. A BIOS program is a set of programs usually stored permanently in a read only memory ("ROM") that provides the most basic control and management of the computer's hardware. When a user turns on the computer, the BIOS program conducts a series of complex tests of the devices installed on the computer. During run-time, the BIOS program provides the operating system and application programs with access to these devices.

One function of the BIOS program is to initialize and to configure the computer hardware when the user turns on the computer 10 ("system boot"). The BIOS program runs a startup program called the POST program, which performs a number of tasks, including:

Test Random Access Memory (RAM)

Conduct an inventory of the hardware devices installed in the computer

Configure hard and floppy disks, keyboard, and serial and parallel ports

Configure other devices installed in the computer such as CD-ROM drives and sound cards Initialize computer hardware required for computer features such as Plug and Play and Power Management Run Setup if requested If prior tasks are successful, then load and run the Operating System such as DOS, OS/2, UNIX, or Windows 95

Thus, at start-up, the computer is configured in accordance with the preferences set by a previous user of the computer. If the current user wants to change the configuration of the computer, then the user must run Setup and make the changes. However, once the changes are made, unless a user changes the configuration after start-up, a subsequent user of the computer will be using the computer as reconfigured by the last user. Clearly, a device that would enable a computer to boot up with the computer configured in accordance with the user's system configuration preferences would be desirable.

Furthermore, currently, the process of configuring a computer or a television is time consuming and inconvenient. In order to configure the computer, the user must enter Setup and make the changes to the configuration. Depending on the parameter that is being changed, the user may have to reboot the computer in order for the modification to be reflected in the computer's configuration. Consequently, many users may not want to spend the time to configure their computers. Thus, a device that enables a user to quickly and conveniently configure their computers would be desirable.

Currently, because the software to boot up a computer resides in the memory of a computer, computers may be accessed without the permission of the owner. Such software may include the BIOS. Clearly, an apparatus that prevents such unauthorized access would be desirable.

The problems discussed above in the context of configuring a computer are equally applicable to configuring set top boxes that control televisions or televisions with a processor built in. In all of these devices, when the device is turned on and the processor performs a system boot, the device will be configured in accordance with the preferences set by a previous user. Thus, a device that enables a user to quickly and conveniently configure these devices would be desirable.

In addition, computers, set top boxes for televisions, or televisions may be used to access the internet or to view television programs. Currently, customizing access to the internet and to television programs amongst various family members is time consuming. A user may have to constantly change the access levels depending on the level of access set by a previous user. Clearly, a device that enables a computer to set the level of access to the internet or to television program based on the user would be desirable.

Finally, there are diskless TVPC systems available. One problem with such systems is the updating of the operating system or other software operative by the processor in such systems. Currently, any updating must be performed by downloading software via a telephone line. This type of updating relies on the integrity of the phone lines. Clearly, an apparatus that facilitates updating software without relying on a telephone line transfer would be desirable.

SUMMARY

One embodiment of the present invention relates to a user configurable computer-based system having a processor with an input/output ("I/O") bus. The system comprises a configuration card having non-volatile memory containing computer instructions governing system configuration and a set of contacts in the computer system for receiving the configuration card and to which the non-volatile memory of the configuration card can be connected. The computer system further comprises a stored boot-up instruction that causes the processor to read on its I/O bus the instructions governing system configuration and to execute the instructions governing system configuration as part of the start up of the system prior to accepting normal/other user input.

DETAILED DESCRIPTION OF THE PREFERRED EMBODIMENT

Figure 1:
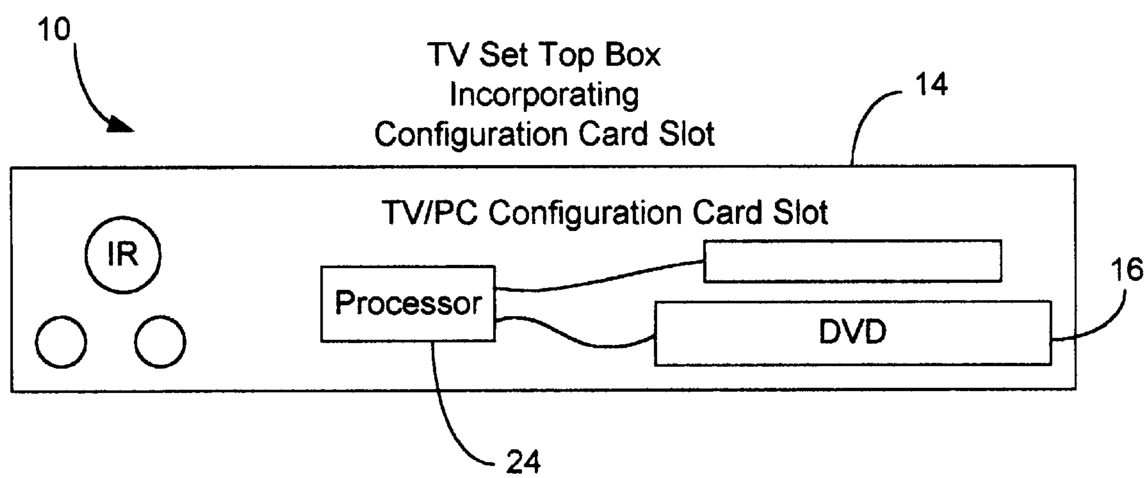
FIG. 1 shows a television ("TV") set top box incorporating a configuration card slot.
Figure 2:
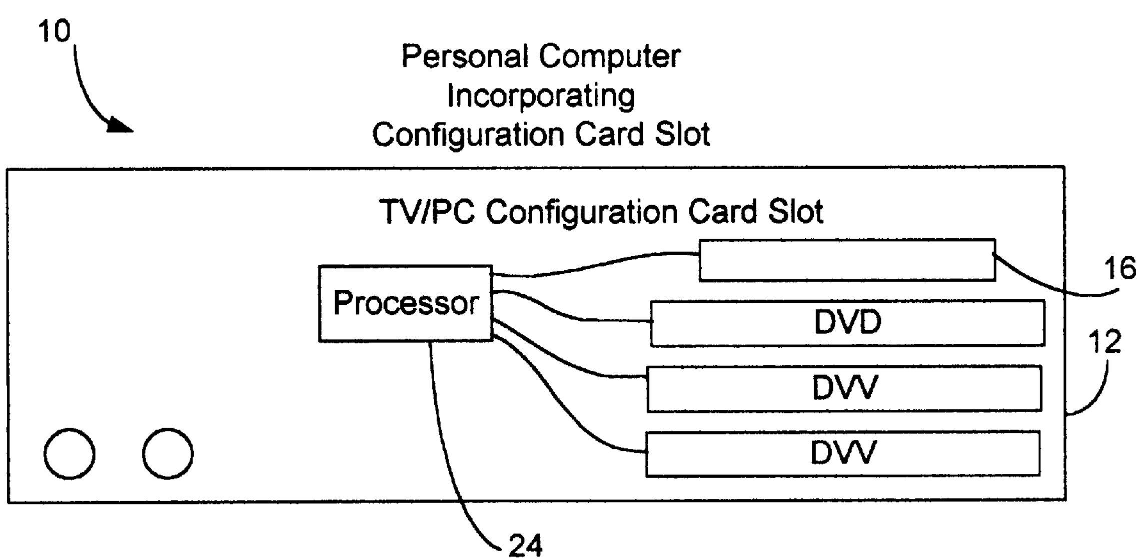
FIG. 2 shows a personal computer incorporating a configuration card slot.
Figure 3:
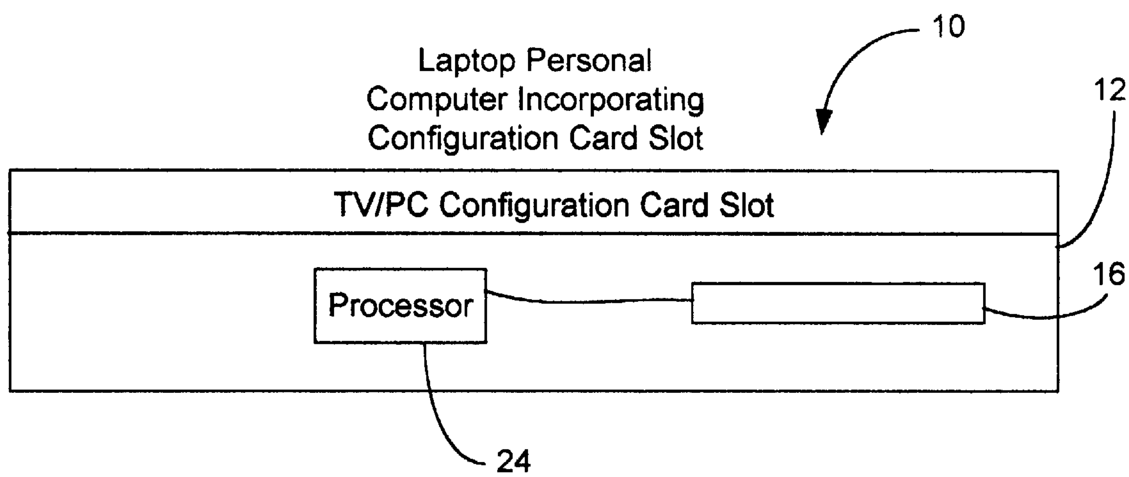
FIG. 3 shows a portable personal computer incorporating a configuration card slot.

FIGS. 1–3 show various audiovisual devices 10 such as a portable or desktop personal computer 12, and a set top terminal 14 for use with a television. Each of these devices may have a configuration card receiving slot 16. In each case, the configuration card receiving slot 16 is adapted to receive a configuration card 18 (which will be described with reference to FIGS. 4A and 4B). In operation, the configuration card 18 will be placed in the configuration card receiving slot 16 such that the configuration card 18 may be accessed by a processor 24 (shown in FIGS. 1–3) in the audiovisual device 10. The configuration card 18 may configure the audiovisual device 10 in accordance with the user's configuration preferences. Furthermore, the user may use his/her configuration card 18 in one or more of these audiovisual devices 10 to enable them and to have them boot up with the user's configuration preferences. In addition to the system configuration, the configuration card 18 may also configure access privileges of a user by providing television channel blocking and web page blocking, thereby controlling access to various channels and/or web pages.

Processor

Before describing the configuration card 18, a brief description of the processor shown in FIGS. 1–3 will be provided. The microprocessor 24 may be any conventional general purpose single- or multi-chip microprocessor such as a Pentium® processor, a Pentium® Pro processor, a 8051 processor, a MIPS® processor, a Power PC® processor, or an ALPHA® processor. In addition, the microprocessor 24 may be any conventional special purpose microprocessor such as a digital signal processor or a graphics processor. The processor 24 executes the programs that reside within memory of an audiovisual device.

As will be explained with reference to FIGS. 4A and 4B, the configuration card 18 comprises an input/output ("I/O") interface. Consequently, the processor 24 may have a stored boot-up instruction that causes the processor 24 to read on its I/O bus the instructions governing system configuration and to execute the instructions governing system configuration as part of the start up of the system prior to accepting normal/other user input.

Configuration Card

Figure 4A:
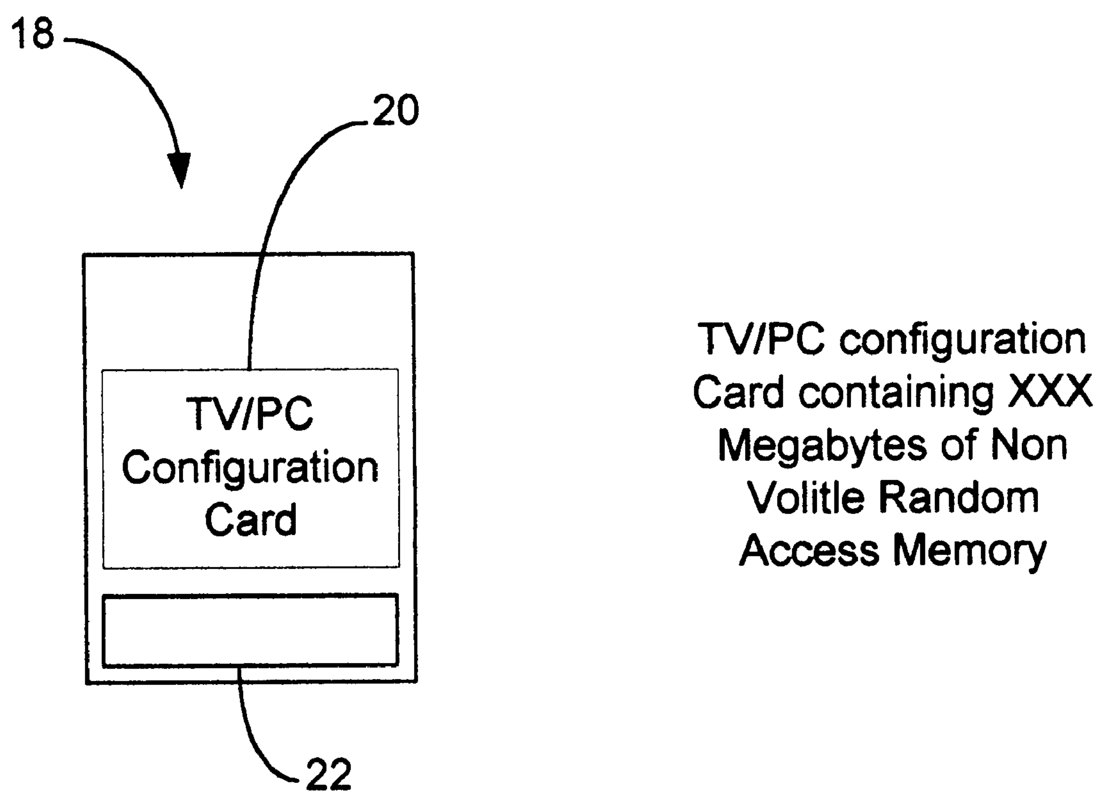
FIG. 4A shows a configuration card.
Figure 4B:
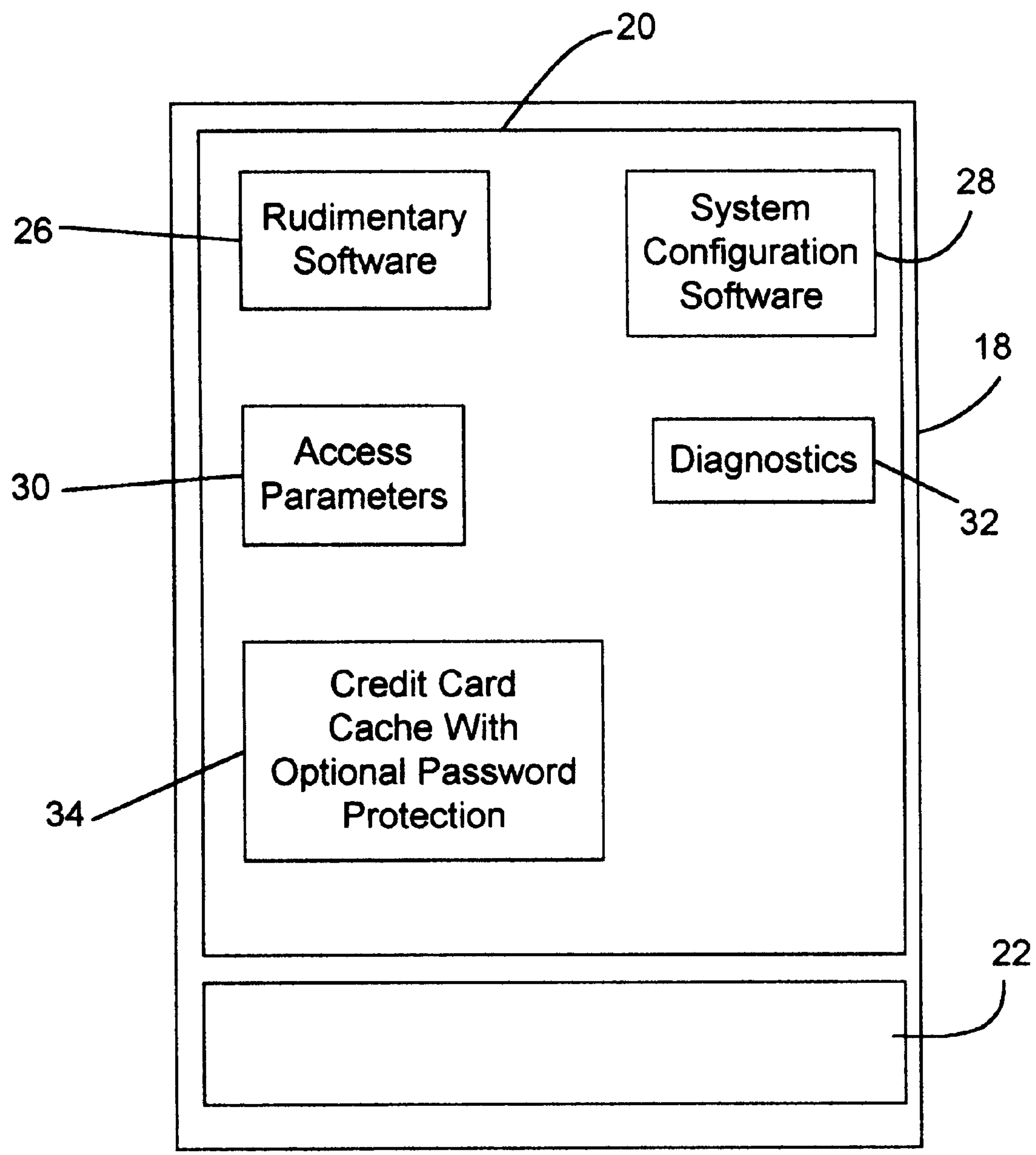
FIG. 4B shows a configuration card with software that may be stored on the card.

FIGS. 4A and 4B show a configuration card 18. The configuration card 18 includes (1) memory 20, (2) a communications interface or communications bus 22 on the card connected to the memory 20 and adapted to communicate with a processor 24 (shown in FIGS. 1–3), and (3) computer instructions and/or configuration data (herein referred to as "computer instructions") stored in memory 20 for implementing rudimentary control software 26 to enable the device to be operational.

The size of a configuration card 18 may be substantially equal to the size of a plastic magnetic-stripe card. The thickness of the configuration card 18 may vary based on the number of integrated circuit chips necessary to form the memory 20 on the card 18.

Memory 20

The configuration card 18 comprises memory 20. The memory 20 may be non-volatile random access memory. This memory 20 may contain computer instructions forming or relating to rudimentary software 26, system configuration software 28 user security/area access parameters 30, diagnostic software 32, and credit card cache 34.

Communications Interface 22

The communications interface 22 on the configuration card 18 may be based on existing PCMCIA/IDE technology. The communications interface 22 would be adapted to communicate with a processor 24 in an audiovisual device 10. In use, a processor 24 would be able to access computer instructions stored in memory 20 through the communications interface 22.

Based on the entries to the boot sector stored in memory, the BIOS performs startup. With the configuration card, when the device is powered up, the processor 24 accesses the configuration card 18 located in the configuration card receiving slot 16 via the communications interface 22. The processor 24 accesses a small program (sometimes referred to as a "bootstrap"program) which controls and executes the loading of the operating system.

As shown in FIG. 4B, computer instructions for performing a variety of functions may be stored in memory 20 of the configuration card 18. Generally, the computer instructions relate to booting up the processor and configuring the user environment. In addition, computer instructions relate to configuration and access to various capabilities of an audiovisual device.

Computer Instructions Stored in Memory

Computer instructions may be stored in memory 20 for implementing rudimentary control software 26 to enable an audiovisual device 10 (i.e., a television, a set top box that is connected to a television, or a computer) to be operational.

Rudimentary Control Software

A configuration card 18 may store in memory rudimentary control software 26 for use by a processor 24 in an audiovisual device 10. Rudimentary control software 26 comprise computer instructions necessary for booting up a processor 24 in an audiovisual device 10 and configuring the environment of an operating system in the audiovisual device 10. Rudimentary software comprises computer instructions that provide a BIOS 27, which includes option ROMs, for use by the processor 24 to configure the audiovisual device 10. A BIOS program is a set of programs that provides the most basic control and management of the computer's hardware or in the case of a set top box, the hardware in the set top box that controls the television. When a user turns on the computer or the set top box, the BIOS program conducts a series of complex tests of the devices installed on the computer or the set top box respectively. During run-time, the BIOS program provides the operating system and application programs with access to these devices. An option ROM, as is well known in the art, is a program which typically configures and controls a specific hardware device in a personal computer or in a set top box.

By providing this rudimentary control software 26 on the configuration card 18, a user may boot up any audiovisual device 10 with a configuration card receiving slot 16 that can receive a configuration card 18 and a processor 24 that can access the memory 20 on the configuration card 18 through the communications interface 22. Using the rudimentary control software 26 stored in memory 20 of the configuration card 18, the processor 24 can perform a system boot and automatically configure the audiovisual device 10 to user's configuration preferences. Thus, the configuration card 18 enables the user to configure any audiovisual device 10 with his/her own preferences, thereby providing a quick and convenient way of transferring the user's preferences to other compatible devices 10.

Moreover, because the rudimentary control software 26 is on the configuration card 18, once the audiovisual device is shut down and the configuration card 18 is removed from the audiovisual device 10, the audiovisual device 10 cannot be booted up. Thus, the audiovisual device 10 cannot be accessed without the configuration card 18 being connected to a processor 24. Consequently, after use of the audiovisual device 10, by removing the configuration card 18, a user can prevent unauthorized access of the audiovisual device 10.

These cards 18 may also be used to update the operating system in an audiovisual device and/or the rudimentary control software 26 for use in an audiovisual device. This feature may be particularly useful in audiovisual devices such as the diskless TVPC systems where a diskette cannot be used to update the operating system. Additional configuration cards 18 may be mailed to registered purchasers of an audiovisual device 10 for updating the operating system or alternatively the system BIOS 27 residing on the card 18.

Computer Instructions For Providing Access

In addition, computer instructions for configuring user security/area access parameters to customer access to various capabilities of an audiovisual device 10, providing user diagnostics, providing a credit card cache for online purchase with optional password protection, and resetting disk and memory caches upon removal and reinsertion of configuration cards 18 may be stored in memory 20. In particular, computer instructions may be stored in memory 20 of the configuration card 18 for (1) providing TV channel/web page blocking, (2) providing controlled timed access, (3) providing user diagnostics such as the POST program, (4) providing a credit card cache for online purchase, (5) providing password protection access the credit card cache and for access to the system, (6) providing multi-level system configuration (i.e., enabling/disabling of individual devices, game ports, CDROMs), and (7) resetting disk and memory caches upon removal and reinsertion of a configuration card 18. Software for each of these features is readily available from various manufacturers.

These features provide parents/users with control over a user's access to various capabilities and/or accessories connected to an audiovisual device. Moreover, because each child/user may have his/her own configuration card 18, the level of access to each device 16 may be customized for each individual.

Also, the configuration card 18 may provide a credit card cache for online purchases. Access to the credit cache may be protected by implementing password protection, whereby a user must enter a preselected password in order to access the credit card cache.

Operation

In operation, each user of an audiovisual device may have a configuration card 18. The user upon insertion of the card 18 into a card configuration receiving slot 16 will enable a processor 24, based on a stored boot-up instruction, to access the computer instructions stored in memory 20 via the communications interface 22. The processor 24 in the audiovisual device 10 will use the rudimentary control software 26 stored in memory 20 to perform a system boot and to configure the environment of the operating system in accordance with the user's configuration preferences. Initially, the operating system of the audiovisual device 10 may be configured using default values. The user may then set his/her configuration preferences. After the user has set his/her preferences, a processor 24 that has accessed the rudimentary control software computer instructions 26 on the configuration card 18 will perform a system boot and automatically configure the operating system of the audiovisual device in accordance with the user's configuration preferences.

In addition, a user may also set access privileges for a user of the card 18 to control access to various capabilities and/or devices connected to the audiovisual device. Based on the set access privileges, the processor 24 will control a user's access to view certain television channels and/or television programs, to certain web pages, to a credit card cache for use with online purchases, and to various diagnostic tools. When the user removes the configuration card 18, the disk and memory caches may be reset. Moreover, removal of the configuration card 18 disables the audiovisual device 10, thereby preventing unauthorized access to the device.

Although the description of the preferred embodiment has been presented, it is contemplated that various changes may be made without deviating from the spirit of the present invention. Accordingly, it is intended that the scope of the present invention not be limited strictly to that of the description of the preferred embodiment of the present invention.

What is claimed is:

1. A user configurable computer-based system having a processor with an input/output ("I/O") bus, comprising:

(a) a configuration card having non-volatile memory containing computer instructions governing system configuration, wherein the computer instructions include at least a portion of a system Basic Input/Output System ("BIOS");

(b) a set of contacts in the computer system for receiving the configuration card and to which the non-volatile memory of the configuration card can be connected; and (c) a stored boot-up instruction causing the processor to read on its I/O bus the instructions governing system configuration and to execute the computer instructions governing system configuration as part of the start up of the system prior to accepting normal/other user input.

2. The system of claim 1, wherein the I/O bus is a PCMCIA/IDE bus.

3. A configuration card, comprising:

(a) memory;

(b) a communications interface on the card connected to memory and adapted to communicate with a processor; and (c) computer instructions stored in memory for implementing rudimentary control software to enable an audiovisual device to be operational, wherein the rudimentary control software computer instructions comprise computer instructions that provide a Basic Input/Output System ("BIOS") for the system.

4. The card of claim 3, further comprising computer instructions for configuring the operating system of the audiovisual device.

5. The card of claim 3, wherein the BIOS computer instructions further comprise computer instructions that provide an option ROM.

6. The card of claim 4, wherein the audiovisual device is at least one of a television, a set top box for a television, or a computer.

7. The card of claim 3, further comprising computer instructions for relating to access parameters to capabilities of an audiovisual device.

8. The card of claim 7, wherein the computer instructions relating to access comprise computer instructions for multi-level system configuration.

9. The card of claim 7, wherein the computer instructions relating to access comprise computer instructions to enable channel blocking.

10. The card of claim 7, wherein the computer instructions relating to access comprise computer instructions to enable web page blocking.

11. The card of claim 7, wherein the computer instructions relating to access comprise computer instructions providing timed access to the system.

12. The card of claim 3, further comprising computer instructions for providing user diagnostics.

13. The card of claim 3, further comprising computer instructions for accessing a credit card cache for use with online purchases.

14. The card of claim 13, wherein the credit card cache is located on the card.

15. The card of claim 3, further comprising computer instructions for resetting of disk and memory caches upon removal and reinsertion of a configuration card.

16. The card of claim 3, wherein the communication interface is a PCMCIA/IDE interface.

17. The card of claim 3, wherein the memory is non-volatile random access memory.

18. A configuration card for use with at least one of a television, a set top box for a television, and a computer, comprising:

(a) non-volatile random access memory;

(b) a communications interface on the card connected to the non-volatile random access memory and adapted to communicate with a processor; and (c) computer instructions stored in the non-volatile random access memory for implementing rudimentary software to enable a system to be operational, wherein the rudimentary control software computer instructions comprise computer instructions that provide a Basic Input/Output System ("BIOS") for the system.

* * * * *